(12) United States Patent
Parisi et al.

(10) Patent No.: US 7,537,410 B2
(45) Date of Patent: May 26, 2009

(54) COUPLING APPARATUS

(75) Inventors: Michael A. Parisi, Fairport, NY (US); Robert S. Karz, Webster, NY (US); Richard W. Seyfried, Williamson, NY (US); Shu Chang, Pittsford, NY (US); John G. Shaw, Victor, NY (US); Rachael L. McGrath, Churchville, NY (US); Jacqueline Y. Tyson, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 178 days.

(21) Appl. No.: 11/590,587

(22) Filed: Oct. 31, 2006

(65) Prior Publication Data

US 2008/0101858 A1 May 1, 2008

(51) Int. Cl.
*F16D 1/00* (2006.01)
(52) U.S. Cl. ............. 403/383; 403/297; 403/327; 464/182; 399/167
(58) Field of Classification Search ............. 403/1, 403/297, 298, 314, 327, 359.2, 359.4, 359.6, 403/361, 383; 464/182; 399/167
See application file for complete search history.

(56) References Cited

U.S. PATENT DOCUMENTS

| | | | | |
|---|---|---|---|---|
| 3,017,207 A * | 1/1962 | Lloyd | ............................ | 403/1 |
| 3,608,936 A * | 9/1971 | Karden | ............................ | 403/359.5 |
| 3,608,937 A * | 9/1971 | Nave | ............................ | 403/327 |
| 3,890,051 A * | 6/1975 | Biek | ............................ | 403/361 |
| 4,178,777 A * | 12/1979 | Ying et al. | ............................ | 403/359.2 |
| 5,450,166 A | 9/1995 | Yashiro | | |
| 5,825,472 A | 10/1998 | Araki et al. | | |
| 5,878,310 A | 3/1999 | Noda et al. | | |
| 5,903,803 A | 5/1999 | Kawai et al. | | |
| 5,926,673 A * | 7/1999 | Foster et al. | ............................ | 399/167 |
| 6,016,413 A | 1/2000 | Yokoyama et al. | | |
| 6,097,900 A | 8/2000 | Haraguchi | | |
| 6,128,454 A | 10/2000 | Kawai et al. | | |
| 6,400,914 B1 | 6/2002 | Noda et al. | | |
| 6,892,042 B2 * | 5/2005 | Jang et al. | ............................ | 399/167 |
| 7,228,090 B2 * | 6/2007 | Toso et al. | ............................ | 399/167 |
| 7,366,443 B2 * | 4/2008 | Ohashi et al. | ............................ | 399/167 |
| 7,433,631 B2 * | 10/2008 | Karz et al. | ............................ | 399/167 |

OTHER PUBLICATIONS

U.S. Appl. No. 11/314,894, filed Dec. 20, 2005, and entitled "Material Supply Module Shaft" by Robert S. Karz et al.

* cited by examiner

*Primary Examiner*—Michael P Ferguson

(57) ABSTRACT

A driven coupling includes three separate cam lobes projecting therefrom that mate with mating female features in a driver coupling. A central straight or tapered bore accepts a conical alignment pin that projects from the driver coupling. Since the cam lobes are independent and are able to radically deflect, under torque load the central bore is closed down to create a highly precise alignment.

5 Claims, 3 Drawing Sheets

COUPLING APPARATUS

Cross-reference is hereby made to commonly assigned and U.S. application Ser. No. 11/314,894 filed Dec. 20, 2005, U.S. Publication No. 20070140735, now U.S. Pat. No. 7.433, 631 and entitled "Material Supply Module Shaft" by Robert S. Karz et al.

Some reprographic or electrostatographic image forming devices, copiers, facsimile apparatus, and printers include a replaceable or refillable material supply module. The material supply module is typically connected to a device via a drive shaft and gear shaft coupling arrangement, which generally includes a drive shaft integral to the module that interacts with a gear shaft integral to the particular device.

FIG. 1 shows a prior art drive shaft and gear shaft coupling arrangement 20, which is currently used in the material supply module of copiers, facsimile apparatus, printers, and similar reprographic or electrostatographic image forming devices. A drive gear 22 drives a drive shaft cylinder 24 of a drive shaft 25. Drive gear 22 includes a gear shaft 26 at its center and an outside edge 28 having gear teeth. Gear shaft 26 has a front surface 30, which includes a twisted triangular coupling hole 32 having defined vertices 33 formed therein. Driveshaft cylinder 24 is fixedly mounted with a cylinder flange 34, which includes an axially outwardly extending concentric shaft 36 and an outside edge 38 having gear teeth. Concentric shaft 36 includes an axially outwardly twisted, triangular coupling member 40, which is axially raised from an outer surface 42 of the shaft for coupling to twisted triangular coupling hole 32 on gear shaft 26 of drive gear 22.

During the life of a device, driveshaft cylinder 24 and drive shaft 25 may be replaced one or more times depending on the frequency of use. Cylinder flange 34 is typically replaced when driveshaft cylinder 24 and drive shaft 25 are replaced. Because twisted triangular coupling member 40 of cylinder flange 34 generally twists in one direction and its torque forces are concentric to its axis of rotation, its fabrication is both complicated and expensive. In addition, because the torque forces acting on twisted triangular coupling member 40 of cylinder flange 34 are concentric to its axis of rotation, the member encounters high stresses.

Another prior art driven coupling 50 for use in a customer replaceable unit (CRU) is shown in FIG. 2 that includes a cylinder flange 51 with an outside edge of teeth 52. An outwardly extending concentric shaft 53 is connected to cylinder flange 51 and has outer surface 54 to which a triangular shaped coupling member 55 extends therefrom. Coupling member 55 has a central bore therein that is adapted to receive a mating pin that is a part of prior art driving member 60 shown in FIG. 3. Drive member 60 is positioned in a conventional reprographic machine and includes an outer bearing and stationary casing 61 within which is positioned a rotatable and retractable machine drive 62. Machine drive 62 has an opening therein that is complementary to the shape of coupling member 55 and a locator or alignment pin 64 centered therein that is adapted to mate with the opening in coupling member 55. Locator pin 64 has the freedom to move in the axial direction. Conical center locator pin 64 is intended to assure centering of the driven coupling. Engagement of this pin is critical for maintaining motion quality while providing precise alignment. Engagement of the driven and driving coupling initially requires a minimal axial engagement, as by virtue of the torque and cam, the two couplings are forced together into complete engagement. Here too, because the torque forces acting on triangular coupling member 55 of cylinder flange 51 are adjacent its axis of rotation, the member encounters high stresses.

Hence, there is still a need for a driven coupling that minimizes high stresses when coupled with a driving coupling.

In answer to the heretofore mentioned need and according to one aspect, there is provided a driven coupling member that includes three separate cam lobes projecting therefrom that mate with mating female features in a driver coupling. A central straight or tapered bore accepts a conical alignment pin that projects from the driver coupling. Since the cam lobes are independent and are able to radically deflect, under torque load the central bore is closed down to create a more precise alignment than heretofore accomplished.

In accordance with another aspect, there is provided a housing mounted driving coupling that includes a conical alignment pin located centrally thereof. A collet coupling member is adapted to mate with the driving coupling with the collet including a housing and a plurality of collapsible cam lobes extending longitudinally outwardly from a central bore thereof. The collapsible cam lobes are adapted to mate with the conical alignment pin of the driving housing to provide a precise coupling arrangement.

Various of the above-mentioned and further features and advantages will be apparent to those skilled in the art from the specific apparatus and its operation or methods described in the example(s) below, and the claims. Thus, they will be better understood from this description of these specific embodiment(s), including the drawing figures (which are approximately to scale) wherein:

Figure 1:
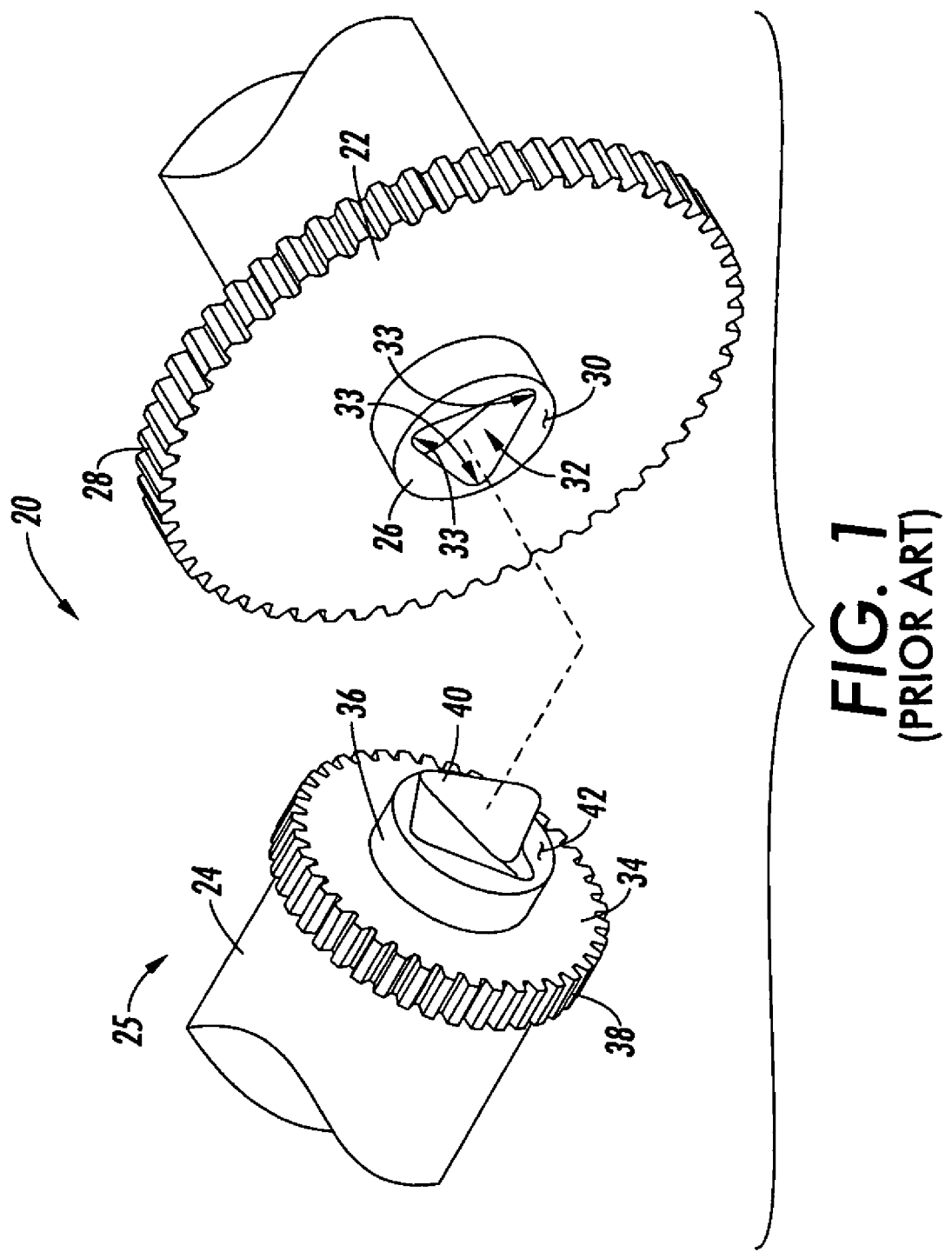
FIG. 1 is a prior art drive shaft and gear shaft coupling arrangement.
Figure 2:
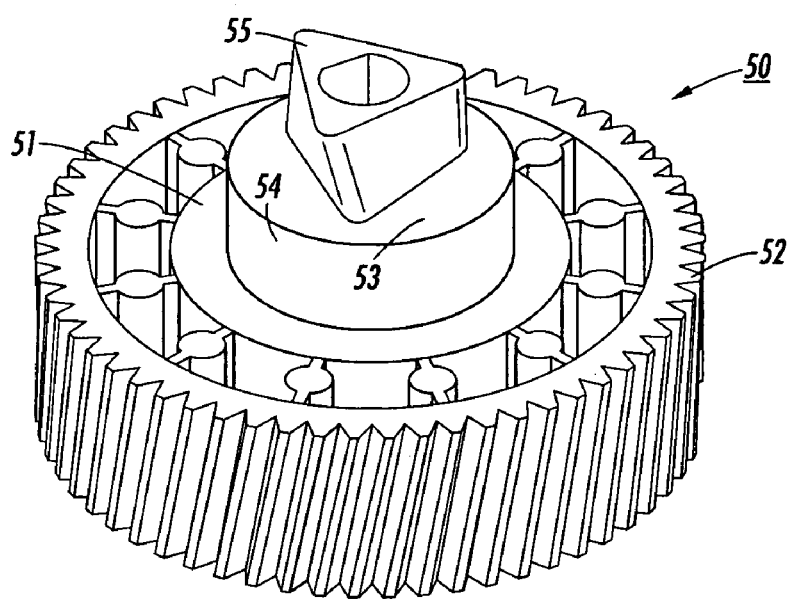
FIG. 2 is a prior art driven coupling.
Figure 3:
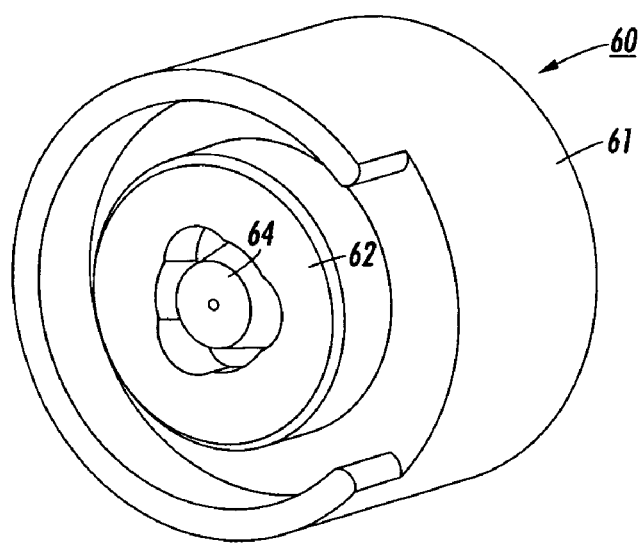
FIG. 3 is a prior art drive coupling arrangement.
Figure 4:
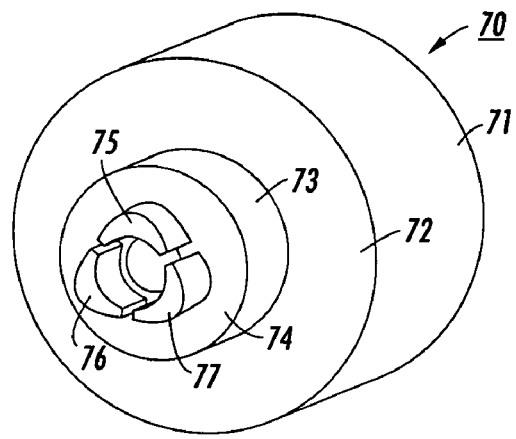
FIG. 4 is a partial perspective view of an improved driven coupling having a cylindrical alignment hole.

FIG. 4 is an improved coupling arrangement 70 to which is attached to the photoreceptor of a replaceable or refillable material supply module and is superior to known prior art driven couplings. Improved coupling arrangement 70 is adapted to mate with drive coupling arrangement 60 in a more precise alignment. Arrangement 70 has a driven shaft cylinder 71 that includes cylinder flange 72 joined to one end thereof. Cylinder flange 72 has a concentric shaft 73 extending longitudinally outwardly therefrom. Concentric shaft 73 includes a front surface 74 that has a triangular opening therein into which is positioned three separate cam lobes 75, 76 and 77 extending longitudinally outwardly from concentric shaft 73. Concentric shaft 73 and plurality of cam lobe members extend longitudinally outwardly with respect to the longitudinal axis of driven shaft cylinder 71, around which the driven shaft rotates. Cam lobe members 75, 76 and 77 are adapted to fit within the triangular coupling hole shown in machine drive 62 of driving member 60 shown in FIG. 3. Cam lobes 75, 76 and 77 are constructed with a cylindrical alignment hole along the axis of rotation of the driven coupling, such that, a circular contact line is established where contact pin 64 of drive member 60 in FIG. 3 contacts the entrance to the driven coupling cylindrical alignment hole. In FIG. 4, the plurality of cam lobe members are three crescent-shaped prongs. In other embodiments, the plurality of can lobe members may be any shape providing they extend longitudinally outwardly from concentric shaft 73 and fit within the triangular coupling hole in machine drive 62 of FIG. 3.

Figure 5:
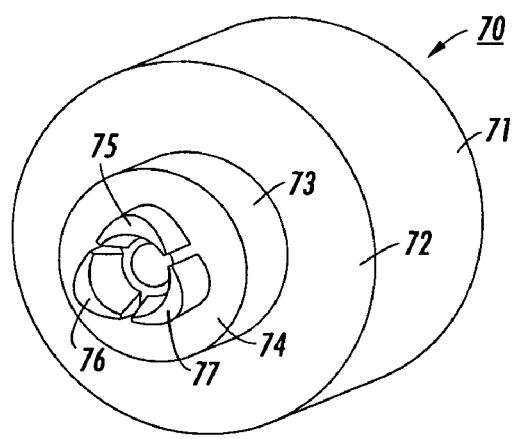
FIG. 5 is a partial perspective view of an improved driven coupling employing a conical alignment hole.

Referring now to FIG. 5, all structure is identical to that of FIG. 4 except that Cam lobes 75, 76 and 77 are constructed with a conical alignment hole along the axis of rotation of the driven coupling, such that, there is a conical contact surface between the driving coupling conical pin 62 and the driven coupling 70 conical alignment hole.

Figure 6:
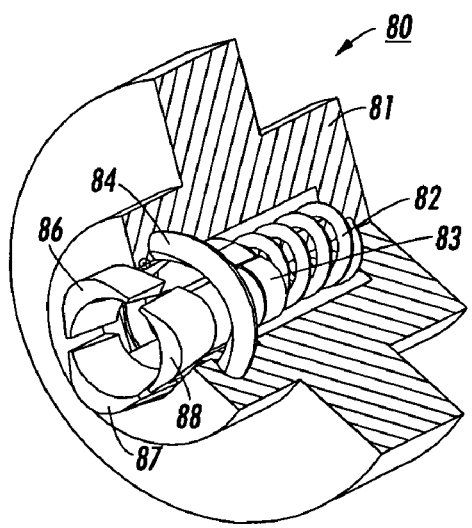
FIG. 6 is a partially sectioned collet showing a plurality of cam members and a conical alignment hole.

Referring now to FIG. 6, a collet 80 is shown which is attached to an end of the photoreceptor of a replaceable or refillable material supply module and includes end cap 81 which houses a spring 82 that presses against a pressure cone 83. An o-ring spring 84 is positioned adjacent pressure cone 83 and surrounds cam lobe or drive tri-cluster members 86, 87 and 88 that present a conical alignment hole. Tri-cluster members 86, 87 and 88 are constructed such that there is a conical contact surface between the driving coupling conical pin 64 of FIG. 3 and the driven coupling conical alignment hole.

The embodiments described herein offer advantages over the prior art. In each of the improvements in FIGS. 4, 5 and 6, the driving coupling's conical pin is forced into the driven element's axial alignment hold by the force in the axial direction created by the torque applied to the cam. The result of this force causes the cam to tend to "collapse" toward the center which is counteracted by the presence of the driving element's center pin and spring. Those forces combine to create a tighter fit between the driven coupling and the driving coupling which reduces the degrees of freedom relating to torque induced failure mechanisms. This will lead to better alignment with larger tolerances than can be achieved by prior art mechanisms.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A reprographic device including a coupling arrangement for connecting a replaceable or refillable material supply to said reprographic device, comprising:
    a rotatable drive shaft connected to and an integral part of said reprographic device, said drive shaft including an alignment pin and complementary recesses around a periphery of said alignment pin; and
    a replaceable material supply module adapted for coupling to said rotatable drive shaft of said reprographic device, said replaceable material supply module including a driven shaft cylinder as an integral part thereof, said driven shaft cylinder including a flange with a concentric shaft extending longitudinally outwardly therefrom, said concentric shaft including a front surface thereof and a plurality of radially collapsible cam lobes extending longitudinally outwardly beyond said front surface of said concentric shaft with said collapsible cam lobes having inner radial surfaces that define an axial alignment hole along an axis of rotation of said driven shaft cylinder, said collapsible cam lobes are adapted to fit over said alignment pin of said rotatable drive shaft and into said complementary recesses around the periphery of said alignment pin during coupling to said rotatable drive shaft while simultaneously creating a cavity between an outer surface of said alignment pin and said inner radial surfaces of said collapsible cam lobes, so that rotation of said rotatable drive shaft forces said alignment pin into said axial alignment hole of said driven shaft cylinder due to torque applied to said collapsible cam lobes during rotation of said rotatable drive shaft, and thereby causing said collapsible cam lobes to radially compress toward the center of said axial alignment hole and occupy said cavity between said outer surface of said alignment pin and said inner radial surfaces of said collapsible cam lobes, thereby creating a tighter fit between said driven shaft cylinder and said rotatable drive shaft to reduce torque induced failures.

2. The device of claim 1, wherein said alignment pin includes a conical surface, and wherein said collapsible cam lobes are configured with a cylindrical alignment hole along an axis of rotation of said driven shaft cylinder in order to establish a circular contact surface with said conical surface of said alignment pin of said rotatable drive shaft when mated in order to achieve increased mating alignment and tolerance between said rotatable drive shaft and said driven shaft cylinder.

3. A coupling arrangement, comprising:
    a driving coupling, and wherein said driving coupling includes a conical pin and complementary recess areas surrounding said conical pin; and
    a collet driven coupling for mating with said driving coupling, said collet driven coupling including a housing with a front end portion and a conical alignment hole through said front end portion of said housing, and a plurality of radially collapsible cam lobes extending longitudinally outwardly beyond said front end portion of said housing and having a complementary shape with respect to said recess areas surrounding said conical pin, a first spring for biasing said collapsible cam lobes radially inwardly, and wherein mating of said driving coupling with said collet driven coupling forms a conical contact surface between said driving coupling conical pin and said driven coupling conical alignment hole, and wherein said collapsible cam lobes having inner radial surfaces that define said conical alignment hole along an axis of rotation of said collet driven coupling, said collapsible cam lobes are adapted to fit over said conical pin of said driving coupling and into said complementary recess areas surrounding said conical pin during coupling to said driving coupling while simultaneously creating a cavity between an outer surface of said conical pin and said inner radial surfaces of said collapsible cam lobes, so that rotation of said drive coupling forces said conical pin into said conical alignment hole of said collet driven coupling due to torque applied to said collapsible cam lobes during rotation of said driving coupling, and thereby causing said collapsible cam lobes to collapse radially toward the center of said conical alignment hole and occupy said cavity between said outer surface of said conical pin and said inner radial surfaces of said collapsible cam lobes, and wherein said collapse of said collapsible cam lobes is countered by said conical pin and said spring in order to reduce the degrees of freedom relating to torque induced failure and increase alignment with greater tolerances.

4. The coupling arrangement of claim 3, wherein said plurality of collapsible cam lobes forms a unit configured in the shape of a triangle.

5. The coupling arrangement of claim 4, wherein said housing includes a pressure cone and wherein said pressure cone is integral with said collapsible cam lobes and is biased outwardly from the center of said conical alignment hole of said housing by a second spring to position said collapsible cam lobes for connection to said driving coupling.

* * * * *